April 20, 1954     G. E. FISHER     2,675,986

HOLDDOWN LOCKING DEVICE

Filed Jan. 19, 1952

INVENTOR.

GLEN E. FISHER

BY

ATTORNEY

Patented Apr. 20, 1954

2,675,986

UNITED STATES PATENT OFFICE 2,675,986

HOLDDOWN LOCKING DEVICE

Glen E. Fisher, Redwood City, Calif., assignor to Collins Radio Company, Cedar Rapids, Iowa, a corporation of Iowa Application January 19, 1952, Serial No. 267,263

5 Claims. (Cl. 248—361)

This invention relates in general to holding means and in particular to apparatus for detachably connecting a radio chassis to a rack mount.

It is oftentimes desirable to mount radio chassis so that they are relatively permanently attached but which may be easily and quickly removed for repair. The chassis must be firmly held, as for example, in an airplane where more or less violent movements of the craft occur.

It is an object of this invention therefore, to provide a radio chassis holding means which has positive holding action but which may easily and quickly be released so that the chassis may be removed.

Another object of this invention is to provide a holding means wherein a locking cam drives a holding plate into engagement with a radio chassis.

Further features, objects and advantages of this invention will become apparent from the following descriptions and claims when read in view of the drawings, in which:

Figure 1:
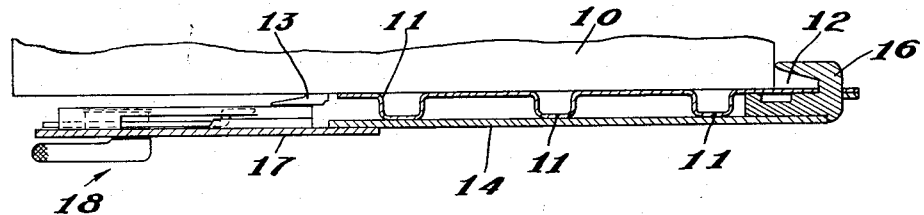
Figure 1 is a sectional, side view illustrating the chassis holding means in the disengaged position.

Figure 1 illustrates a bottom portion of a radio chassis, designated as 10, which has three transverse supporting members 11 attached to its bottom and a rear holding pin 12 attached to the rear portion. A wedge shaped dog 13 is attached to the underside of the chassis 10 toward the forward edge thereof.

The chassis holding apparatus of this invention comprises a first base plate 14 upon which the members 11 rest. A V-shaped receiving member 16 is attached to the end of the plate 14 and is adapted for receiving the locking pin 12 therein.

Toward the front of the holding member is mounted a second plate 17 which is attached to the plate 14. A cam locking assembly, designated generally as 18 is mounted in plate 17.

Figure 2:
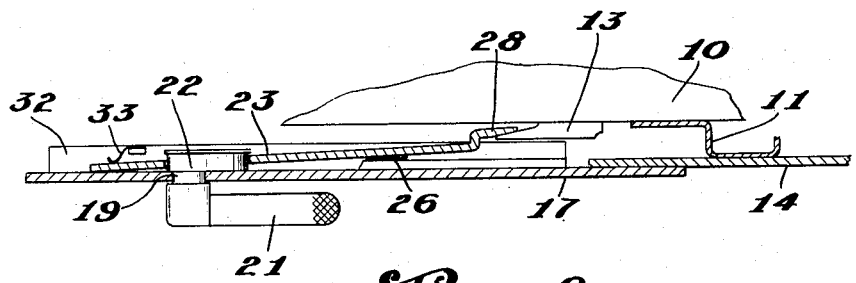
Figure 2 is a side, sectional view illustrating the locking means in the engaged position.

The cam locking assembly is best shown in Figure 2 and comprises, a shaft 19 which is rotatably supported in the plate 17 and has a handle 21 attached to its lower end. A circular disc 22 is attached to the shaft 19 offset from its center so as to form a cam.

Figure 3:
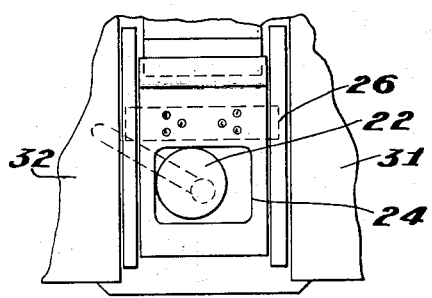
Figure 3 is a top, partial view illustrating the engaged position.

A locking plate 23 is generally rectangular in shape and is formed with an opening 24 best shown in Figure 3 into which the cam 22 is received.

Operation of the lever 21 moves the plate 23 longitudinally of the plate 17.

Figure 5:
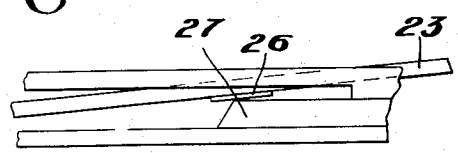
Figure 5 is a detailed side view illustrating the raising means for the locking plate.

A cross member 26 is attached to the plate 23 and is engageable with a slide 27. This is best shown in detail view of Figure 5. Engagement of the cross-member 26 with the slide 27 causes the forward end of the plate 23 to be moved upwardly when the cam 22 pushes it forward.

An engaging portion 28 is formed at the forward end of the plate 23 and engages the dog 13 mounted to the chassis 10 as shown in Figure 2.

Guide plates 31 and 32 respectively, are mounted on the plate 17 and hold the plate 23 in the correct position.

A spring 33 is attached between guide plates 31 and 32 so as to hold the rear end of the plate 23 down.

Figure 4:
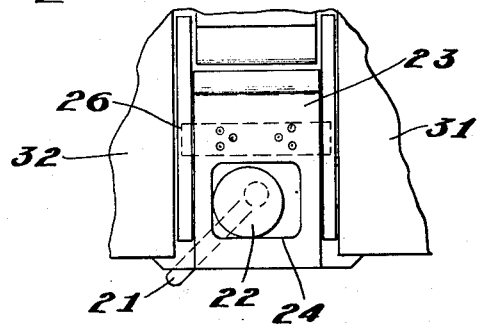
Figure 4 is a partial, top view illustrating the disengaged position.

In operation the handle 21 is moved to the position shown in Figure 4 so as to pull the plate 23 downward and backward out of engagement with the dog 13. The chassis 10 may then be removed. The same chassis or a new one may be replaced on the holding means. The pin 12 will engage the clamp 16 and the handle 21 may be rotated counterclockwise with respect to Figure 4 into its new position as shown in Figure 3. This will cause the plate 23 to move forwardly and upwardly so that the portion 28 engages the dog 13.

It is to be noted that the handle 21 turns until the cam 22 is past the dead center position.

It is seen that this invention provides a quick connect or disconnect holding means which requires that only the handle 21 be moved to lock the chassis in place.

Although this invention has been described with respect to a particular embodiment thereof, it is not to be so limited as changes and modifications may be made therein which are within the full intended scope of the invention as defined by the appended claims.

I claim:

1. Means for detachably connecting a first member to a second member comprising, a pin attached to the first member, a receiving member attached to the rear edge of the second member, said pin receivable in said receiving member, a wedge-shaped dog attached to the first member, a locking plate slideably mounted on the second member, and a disc pivotally supported by said second member at an off-center position and engageable with said locking plate to move it rearwardly and upwardly into engagement with said dog.

2. Apparatus for detachably connecting a first and second member comprising, a pin mounted to the rear of the first member, a wedge shaped member receiving said pin and attached to the second member, a wedge-shaped dog attached to the first member, a locking plate slideably mounted to said second member and engageable with said dog, a disc rotatably supported in said second member at an off-center position, and a handle connected to said shaft so as to control the position of said locking plate.

3. Locking means for detachably connecting a first and second member comprising, a wedge-shaped dog attached to the said first member, a shaft rotatably supported by said second member, a handle attached to one end of said shaft, a disc mounted to the other end of said shaft at an off-center position, a locking plate generally rectangular in shape and formed with an opening through which said disc extends, a cross member attached to said locking plate, a slide member attached to said second member and engageable with said cross member so as to cam it upwardly as it is moved forward by said disc, and an engaging portion attached to the forward end of said locking plate to engage said dog.

4. Means for locking a pair of members together comprising, a wedge-shaped dog attached to the first member, a locking plate formed with a central opening, a disc extending through said opening, a shaft rotatably supported by said second member and attached to said disc at an off-center position, a handle attached to the opposite end of said shaft, a slide member attached to said second member, and a cross member attached to said locking plate and engageable with said slide member so as to cam it upwardly when it is moved forward by said disc.

5. Latching means for wedging a radio chassis to a base member comprising, a locking plate with parallel sides and an opening formed through one end, a pair of parallel guide plates attached to said base member with said locking plate received and guided between them, a shaft rotatably received through said base member, a cam mounted eccentrically on one end of said shaft and received in said opening in said locking plate, a handle fixed on the other end of said shaft so that said locking plate will reciprocate between said guide plates when said handle is rotated, a rise member attached to said base member between said guide plates, a transverse member attached to said locking plate and engageable with said rise member to lift it upward when said locking plate is moved forward, and a wedge-shaped dog attached to said chassis to engage the lifted end of said locking plate.

References Cited in the file of this patent

UNITED STATES PATENTS

| Number | Name | Date |
|---|---|---|
| 457,841 | Ransom | Aug. 18, 1891 |
| 750,282 | Honold | Jan. 26, 1904 |
| 1,152,600 | Carleton | Sept. 7, 1915 |
| 1,343,568 | Leitch | June 15, 1920 |
| 1,426,762 | Nott | Aug. 22, 1922 |
| 1,884,370 | Swanson | Oct. 25, 1932 |

FOREIGN PATENTS

| Number | Country | Date |
|---|---|---|
| 247,693 | Great Britain | 1926 |